United States Patent
Lee

(10) Patent No.: US 9,161,382 B2
(45) Date of Patent: Oct. 13, 2015

(54) METHOD AND APPARATUS FOR PROXIMITY-BASED SERVICE

(71) Applicant: LG ELECTRONICS INC., Seoul (KR)

(72) Inventor: Ki-Dong Lee, San Diego, CA (US)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/229,343

(22) Filed: Mar. 28, 2014

(65) Prior Publication Data

US 2014/0295868 A1    Oct. 2, 2014

Related U.S. Application Data

(60) Provisional application No. 61/806,364, filed on Mar. 28, 2013, provisional application No. 61/820,677, filed on May 7, 2013, provisional application No. 61/898,459, filed on Oct. 31, 2013.

(51) Int. Cl.
H04W 76/04    (2009.01)

(52) U.S. Cl.
CPC .................................. H04W 76/046 (2013.01)

(58) Field of Classification Search
CPC combination set(s) only.
See application file for complete search history.

(56) References Cited

U.S. PATENT DOCUMENTS

| 7,864,726 B2 | 1/2011 | Lee et al. | |
|---|---|---|---|
| 2009/0239563 A1 | 9/2009 | Ou et al. | |
| 2009/0296675 A1 | 12/2009 | Tenny et al. | |
| 2011/0105127 A1 | 5/2011 | Wu | |
| 2011/0170481 A1 | 7/2011 | Gomes et al. | |
| 2014/0243038 A1* | 8/2014 | Schmidt et al. | 455/552.1 |
| 2014/0256365 A1* | 9/2014 | Schmidt et al. | 455/466 |

* cited by examiner

*Primary Examiner* — Diane Mizrahi
(74) *Attorney, Agent, or Firm* — Birch, Stewart, Kolasch & Birch, LLP

(57) ABSTRACT

A method and apparatus are described for managing a communication connection by a User Equipment (UE) in a wireless communication system. In one embodiment, a first message is transmitted for requesting a Radio Resource Control (RRC) connection. The first message includes a cause of the request related with a Proximity-based Service (ProSe), and an identifier randomly generated for the communication connection by the UE and set to be effective for a predetermined time. The communication connection is established via a network path. A second message is received from a ProSe server. The second message indicates whether the communication connection is out of proximity range or not. When the second message indicates that the communication connection is out of the proximity range, a third message for requesting one of a proximity range extension and a communication connection release is transmitted to the ProSe server.

10 Claims, 12 Drawing Sheets

(a)

(b)

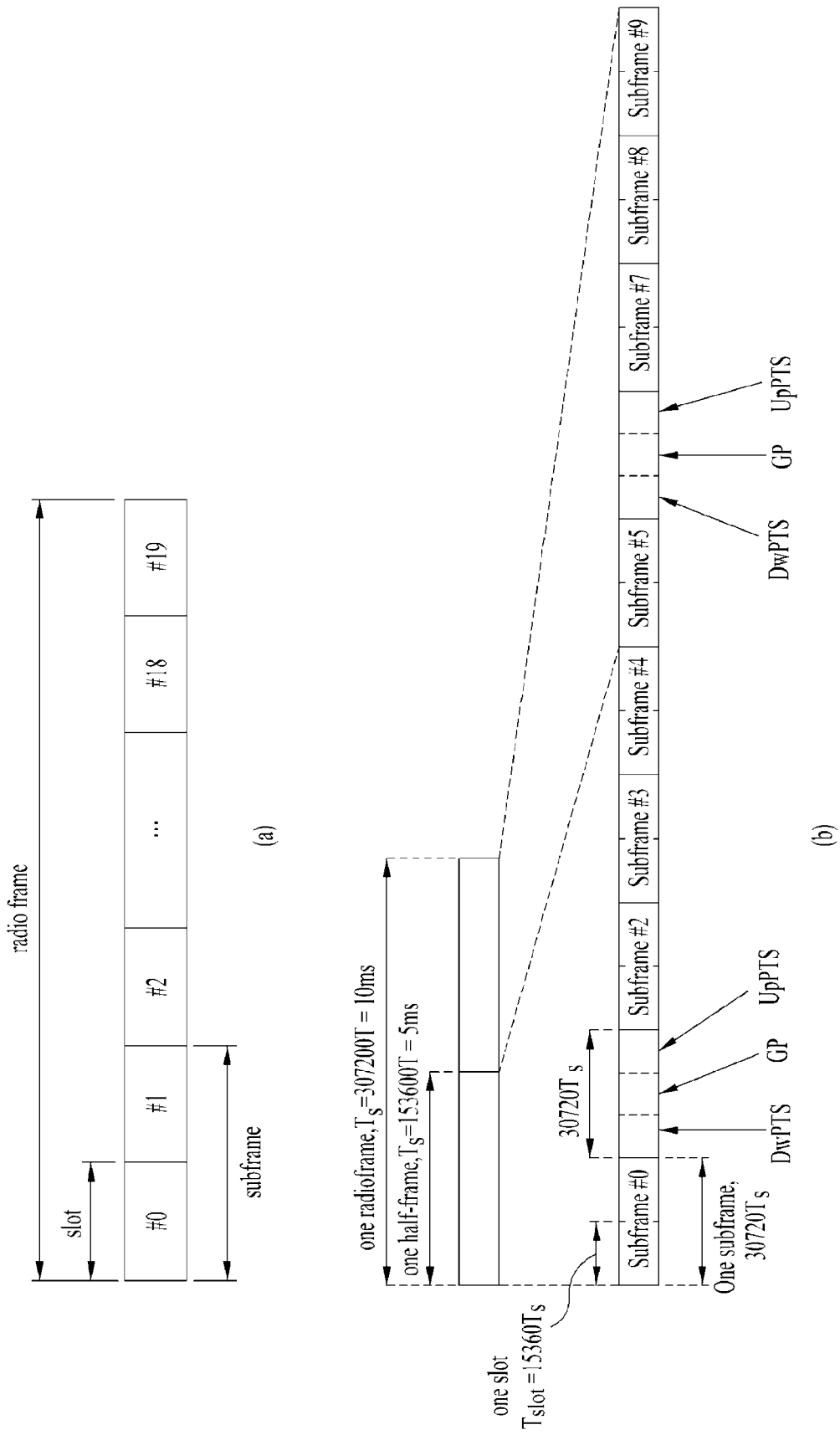

METHOD AND APPARATUS FOR PROXIMITY-BASED SERVICE

Pursuant to 35 U.S.C. §119(e), this application claims the benefit of U.S. provisional application 61/806,364, filed on Mar. 28, 2013, U.S. provisional application 61/820,677, filed on May 7, 2013, and U.S. provisional application 61/898,459, filed on Oct. 31, 2013, which are hereby incorporated by reference as if fully set forth herein.

TECHNICAL FIELD

The present invention is directed to a method and an apparatus for use in a wireless communication system. Specifically, the present invention is directed to a method and an apparatus for proximity-based service.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system and the like.

DISCLOSURE

Technical Problem

An object of the present invention is to provide a method and an apparatus of efficiently managing a communication connection, preferably a communication connection related with a proximity-based service.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

As an aspect of the invention, a method of managing a communication connection by a User Equipment (UE) in a wireless communication system, the method comprising: transmitting a first message for requesting a Radio Resource Control (RRC) connection, wherein the first message includes information indicating a cause of the request; establishing the communication connection via a network path; and receiving a second message from a Proximity-based Service (ProSe) server if the cause of the request is related with a ProSe, wherein the second message indicates whether the communication connection is out of proximity range or not, wherein, if the second message indicates that the communication connection is out of the proximity range, a third message for requesting one of a proximity range extension and a communication connection release is transmitted to the ProSe server.

As another aspect of the invention, a user equipment (UE) configured to manage a communication connection in a wireless communication system is provided, in which the UE comprises: a radio frequency (RF) unit; and a processor, wherein the processor is configured to: transmit a first message for requesting a Radio Resource Control (RRC) connection, wherein the first message includes information indicating a cause of the request, establish the communication connection via a network path, and receive a second message from a Proximity-based Service (ProSe) server if the cause of the request is related with a ProSe, wherein the second message indicates whether the communication connection is out of proximity range or not, wherein, if the second message indicates that the communication connection is out of the proximity range, a third message for requesting one of a proximity range extension and a communication connection release is transmitted to the ProSe server.

Preferably, if the second message indicates that the communication connection is within the communication range, no message may be transmitted to the ProSe server in response to the second message.

Preferably, if the cause of the request is related with the ProSe, a fourth message for updating a location of the UE may be periodically transmitted to the ProSe server before receiving the second message.

Preferably, if the cause of the request is related with the ProSe, the first message may further include an identifier related with the communication connection, and the identifier related with the communication connection may be set to be effective for a predetermined time.

Preferably, the identifier related with the communication connection may be an identifier which is randomly generated for the communication connection by the UE.

Preferably, if the predetermined time has passed before the UE receives the second message indicating that the communication connection is within the proximity range, a fifth message for requesting the communication connection release may be transmitted to the ProSe server.

Preferably, type of the network path may include an Evolved Packet Core (EPC) path.

Advantageous Effects

Exemplary embodiments of the present invention have the following effects. In accordance with the embodiments of the present invention, a communication connection, preferably a communication connection related with a proximity-based service is efficiently provided.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 4 shows a radio frame structure.

MODE FOR INVENTION

Reference will now be made in detail to the preferred embodiments of the present invention referring to the accompanying drawings. The detailed description, which will be given below Referring to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, Global System for Mobile communications (GSM), General Packet Radio Service (GPRS), Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of the Universal Mobile Telecommunications System (UMTS). 3rd Generation Partnership Project (3GPP) Long Term Evolution (LTE) is a part of Evolved UMTS (E-UMTS) that uses E-UTRA. The LTE-Advanced (LTE-A) is an evolved version of 3GPP LTE. Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto.

Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto. Specific terms used for the exemplary embodiments of the present invention are provided to aid in understanding of the present invention. These specific terms may be replaced with other terms within the scope and spirit of the present invention.

Figure 1:
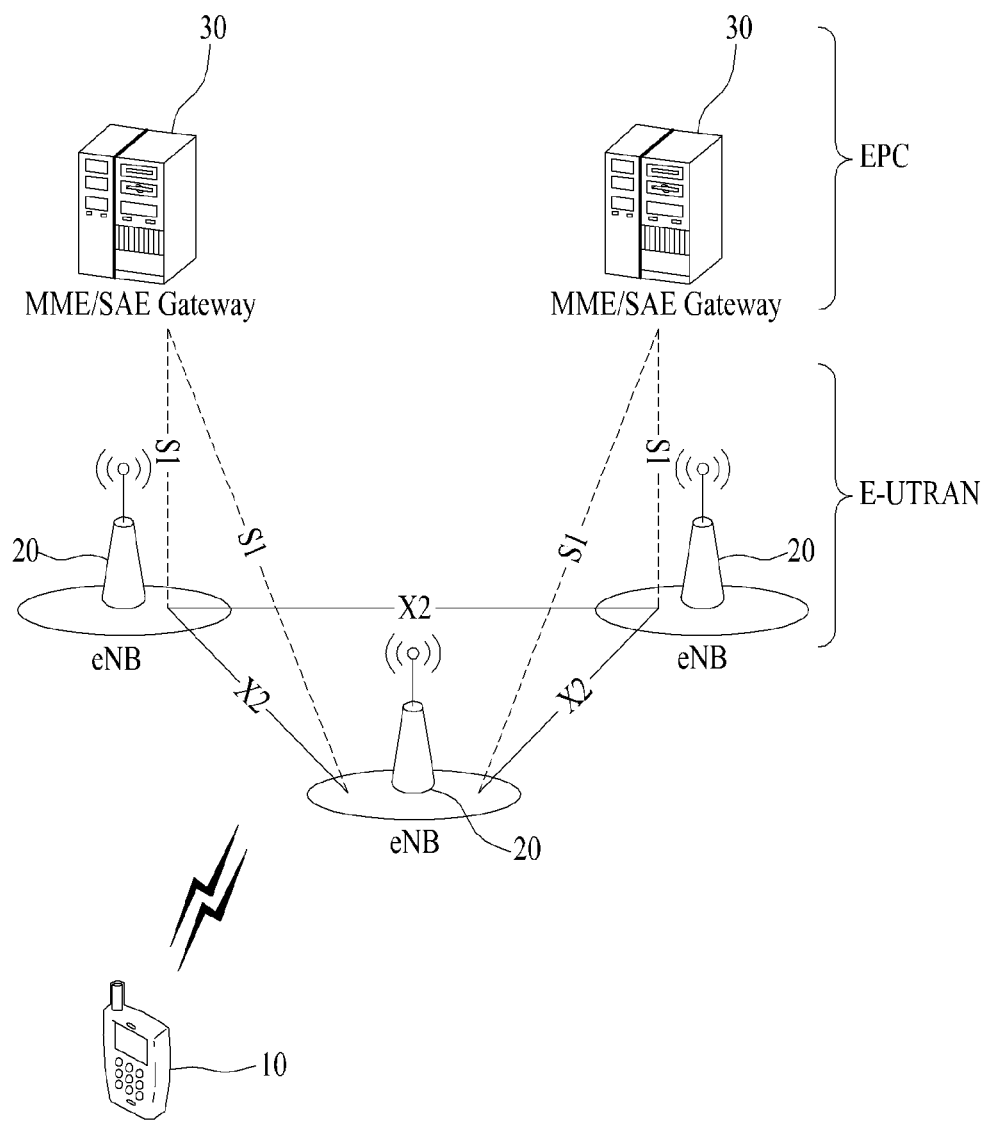
FIG. 1 shows a network structure of an Evolved Universal Mobile Telecommunication System (E-UMTS).

FIG. 1 illustrates a network structure of an E-UMTS. The E-UMTS may be also referred to as an LTE system. The E-UMTS is widely deployed to provide a variety of communication services such as voice and packet data, and is generally configured to function based upon the various techniques presented herein and discussed in more detail with regard to later figures.

Referring to FIG. 1, the E-UMTS network includes an Evolved UMTS Terrestrial Radio Access Network (E-UTRAN), an Evolved Packet Core (EPC), and one or more mobile terminals (or User Equipment (UE)) 10. The E-UTRAN includes one or more eNodeBs (eNBs) 20. Regarding the EPC, Mobility Management Entity/System Architecture Evolution (MME/SAE) gateway 30 provides an end point of a session and mobility management function for the UE 10. The eNB 20 and the MME/SAE gateway 30 may be connected via an S1 interface.

The UE 10 is a communication device carried by a user and may also be referred to as a Mobile Station (MS), a User Terminal (UT), a Subscriber Station (SS) or a wireless device. In general, the UE includes a transmitter and processor, among other components, and is configured to operate in accordance with the various techniques presented herein.

The eNB 20 is generally a fixed station that communicates with the UE 10. In addition to being referred to as a base station, the eNB 20 may also be referred to as an access point. An eNB 20 provides end points of a user plane and a control plane to the UE 10. In general, the eNB includes a transmitter and processor, among other components, and is configured to operate in accordance with the various techniques presented herein.

A plurality of UEs 10 may be located in one cell. One eNB 20 is typically deployed per cell. An interface for transmitting user traffic or control traffic may be used between eNBs 20. Here, "downLink (DL)" refers to communication from the eNB 20 to the UE 10, and "UpLink (UL)" refers to communication from the UE to the eNB.

The MME gateway 30 provides various functions including distribution of paging messages to eNBs 20, security control, idle state mobility control, SAE bearer control, and ciphering and integrity protection of Non-Access Stratum (NAS) signaling. The SAE gateway 30 provides assorted functions including termination of U-plane packets for paging reasons, and switching of the U-plane to support UE mobility.

A plurality of nodes may be connected between eNB 20 and gateway 30 via the S1 interface. The eNBs 20 may be connected to each other via an X2 interface and neighboring eNBs may have a meshed network structure that has the X2 interface.

Figure 2:
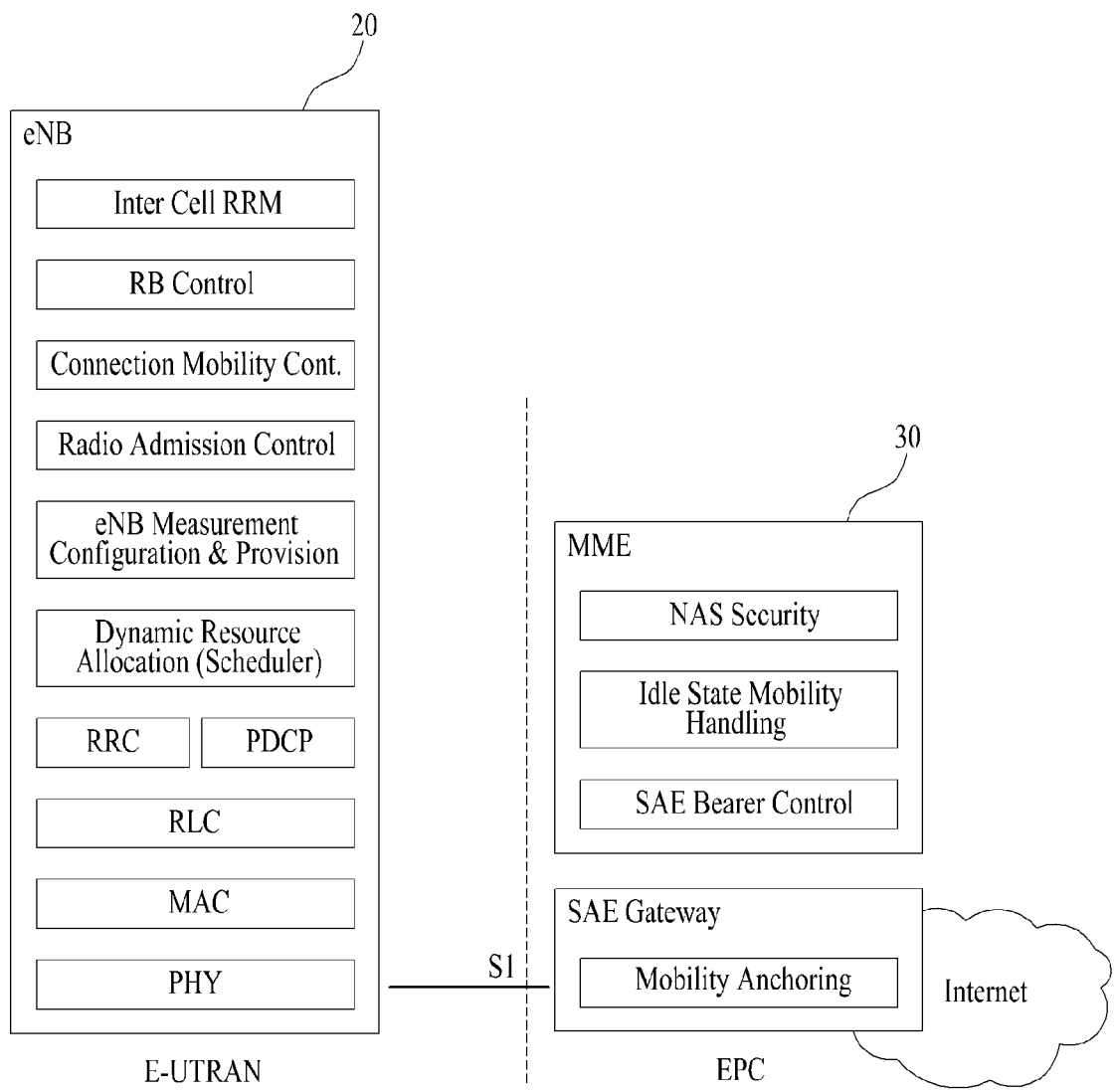
FIG. 2 shows a general structure of a typical E-UTRAN and that of a typical Evolved Packet Core (EPC).

FIG. 2 is a block diagram depicting general structures of an E-UTRAN and an EPC. Referring to FIG. 2, eNB 20 may perform functions of selection for MME/SAE gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, Radio Admission Control (RAC), and connection mobility control in LTE_ACTIVE state.

In the EPC, and as described above, MME/SAE gateway 30 may perform functions of paging origination, LTE-IDLE state management, ciphering of the user plane, SAE bearer control, and ciphering and integrity protection of NAS signaling.

Figure 3A:
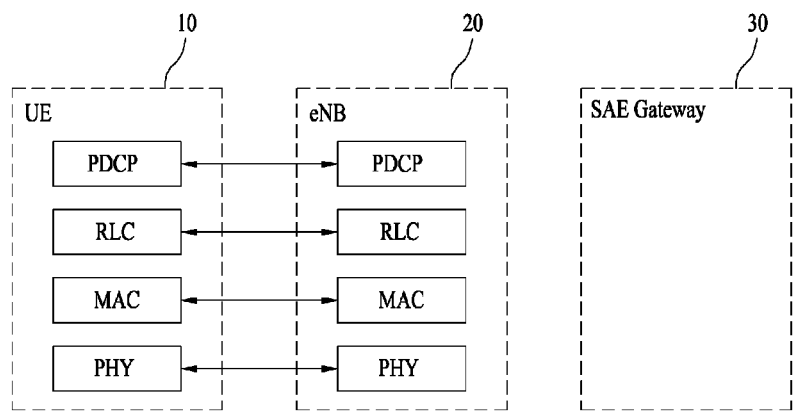
FIGS. 3A~3B show a user-plane protocol and a control-plane protocol stack for the E-UMTS network.
Figure 3B:
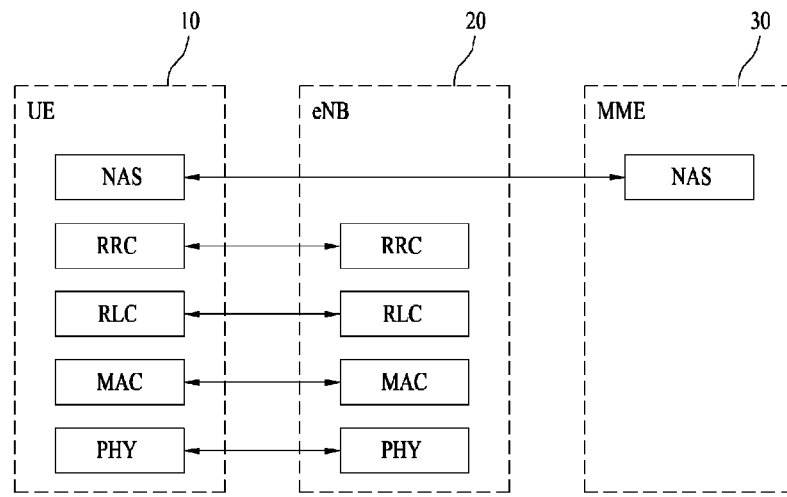

FIGS. 3A~3B illustrate the user-plane protocol and the control-plane protocol stack for the E-UMTS network. Referring to FIGS. 3A~3B, the protocol layers may be divided into a first layer (L1), a second layer (L2) and a third layer (L3)

based upon the three lower layers of an Open System Interconnection (OSI) standard model as known in the art of communication systems.

The first layer L1 (or the physical layer) provides an information transmission service to an upper layer using a physical channel. The physical layer is connected with a Medium Access Control (MAC) layer through a transport channel, and data between the MAC layer and the physical layer are transferred via the transport channel. Between different physical layers, namely, between physical layers of a transmission side and a reception side (for example, between physical layers of UE 10 and eNB 20), data are transferred via the physical channel.

The MAC layer of Layer 2 (L2) provides services to a Radio Link Control (RLC) layer via a logical channel. The RLC layer of Layer 2 (L2) supports a reliable transmission of data. Although the RLC layer is shown in FIGS. 3A~3B as being separate from the MAC layer, it is understood that the functions of the RLC layer may be performed by the MAC layer and that, therefore, a separate RLC layer is not required. Referring to FIG. 3A, the Packet Data Convergence Protocol (PDCP) layer of Layer 2 (L2) performs a header compression function that reduces unnecessary control information such that data being transmitted by employing Internet Protocol (IP) packets, such as IPv4 or IPv6, can be efficiently sent over a radio (wireless) interface that has a relatively narrow bandwidth.

Referring to FIG. 3B, a Radio Resource Control (RRC) layer located at the lowest portion of the third layer (L3) is typically only defined in the control plane and controls logical channels, transport channels and the physical channels in relation to the configuration, reconfiguration, and release of the Radio Bearers (RBs). Here, the RB means a service provided by the second layer (L2) for data transmission between the terminal and the E-UTRAN.

Referring to FIG. 3A, the RLC and MAC layers (terminated in an eNB 20 on the network side) may perform functions such as Scheduling, Automatic Repeat reQuest (ARQ), and Hybrid Automatic Repeat reQuest (HARQ). The PDCP layer (terminated in eNB 20 on the network side) may perform the user plane functions such as header compression, integrity protection, and ciphering.

Referring to FIG. 3B, the RLC and MAC layers (terminated in an eNB 20 on the network side) perform the same or similar functions as for the control plane. The RRC layer (terminated in an eNB 20 on the network side) may perform functions such as broadcasting, paging, RRC connection management, RB control, mobility functions, and UE measurement reporting and controlling. The NAS control protocol (terminated in the MME 30 on the network side) may perform functions such as a SAE bearer management, authentication, LTE_IDLE mobility handling, paging origination in LTE_IDLE, and security control for the signaling between the gateway and UE 10.

The NAS control protocol may use three different states: first, a LTE_DETACHED state if there is no RRC entity; second, a LTE_IDLE state if there is no RRC connection while storing minimal UE information; and third, an LTE_ACTIVE state if the RRC connection is established.

Thus RRC state may be divided into two different states such as an RRC_IDLE state and an RRC_CONNECTED state. In the RRC_IDLE state, the UE 10 may receive broadcasts of system information and paging information while the UE specifies a Discontinuous Reception (DRX) configured by NAS, and the UE has been allocated an identification (ID) (e.g., System Architecture Evolution-Temporary Mobile Subscriber Identity (S-TMSI)) which uniquely identifies the UE in a tracking area. Also, in the RRC-IDLE state, no RRC context is stored in the eNB.

In the RRC_IDLE state, the UE 10 specifies the paging DRX (Discontinuous Reception) cycle. Specifically, the UE 10 monitors a paging signal at a specific paging occasion of every UE specific paging DRX cycle.

In the RRC_CONNECTED state, the UE 10 has an E-UTRAN RRC connection and a RRC context is stored in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, and the network can control mobility (handover) of the UE.

FIG. 4 illustrates a radio frame structure. In a cellular OFDM wireless packet communication system, uplink/downlink data packet transmission is performed on a subframe-by-subframe basis. A subframe is defined as a predetermined time interval including a plurality of OFDM symbols. 3GPP LTE supports a type-1 radio frame structure for FDD (Frequency Division Duplex) and a type-2 radio frame structure for TDD (Time Division Duplex).

FIG. 4(a) illustrates a type-1 radio frame structure. A downlink subframe includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on Cyclic Prefix (CP) configuration. When an OFDM symbol is configured with a normal CP, for example, the number of OFDM symbols included in one slot may be 7. When an OFDM symbol is configured with an extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 4(b) illustrates a type-2 radio frame structure. The type-2 radio frame includes 2 half frames. Each half frame includes 5 subframes, a Downlink Pilot Time Slot (DwPTS), a Guard Period (GP), and an Uplink Pilot Time Slot (UpPTS). The DwPTS is used for initial cell search, synchronization or channel estimation. The UpPTS is used for channel estimation in a BS and UL transmission synchronization acquisition in a UE. The GP eliminates UL interference caused by multipath delay of a DL signal between a UL and a DL.

Figure 5:
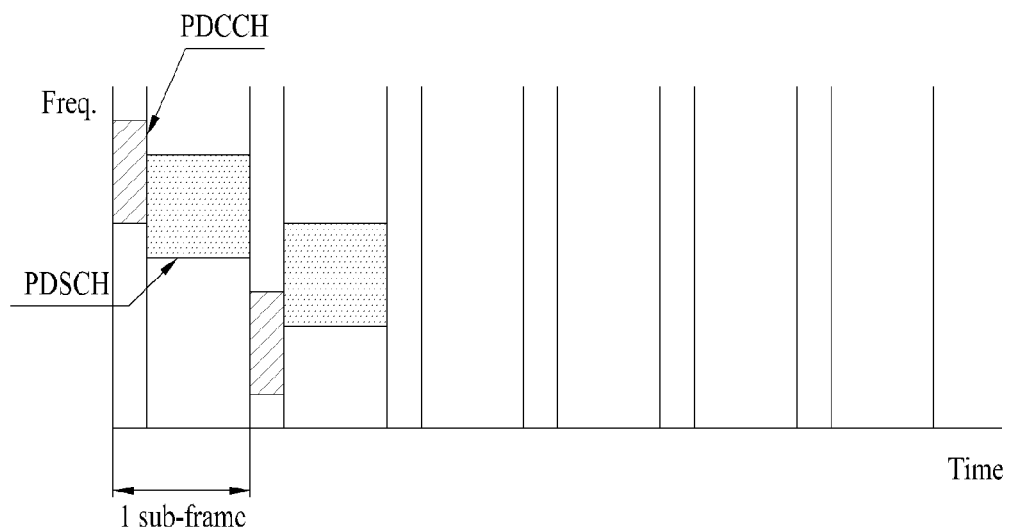
FIG. 5 shows a downlink subframe and physical channels.

FIG. 5 illustrates a downlink subframe and physical channels.

Referring to FIG. 5, the downlink subframe includes a plurality of slots (e.g., two). The number of OFDM symbols included in one slot may be changed according to the length of a Cyclic Prefix (CP). For example, in case of a normal CP, the slot may include seven OFDM symbols. The downlink subframe is divided into a data region and a control region in a time domain. A maximum of three (or four) OFDM symbols located in the front part of a first slot of the subframe may correspond to a control region to which a control channel is allocated. The remaining OFDM symbols correspond to a data region to which a Physical Downlink Shared Channel (PDSCH) is allocated. A variety of downlink control channels may be used in LTE(-A), for example, a Physical Control Format Indicator Channel (PCFICH), a Physical Downlink Control Channel (PDCCH), a Physical hybrid ARQ indicator Channel (PHICH), etc. The PCFICH is transmitted on the first OFDM symbol of the subframe, and carries information about the number of OFDM symbols used for transmitting control channels within the subframe. The PHICH carries a Hybrid Automatic Repeat reQuest Acknowledgment/Negative-Acknowledgment (HARQ ACK/NACK) signal as a response to an uplink transmission signal.

Control information transmitted over a PDCCH is referred to as Downlink Control Information (DCI). DCI includes resource allocation information for either a UE or a UE group and other control information. For example, DCI includes UL/DL scheduling information, an UL transmission (Tx) power control command, etc.

The PDCCH carries a variety of information, for example, transmission format and resource allocation information of a DownLink Shared Channel (DL-SCH), transmission format and resource allocation information of an UpLink Shared Channel (UL-SCH), paging information transmitted over a Paging Channel (PCH), system information transmitted over the DL-SCH, resource allocation information of an upper-layer control message such as a random access response transmitted over PDSCH, a set of Tx power control commands of each UE contained in a UE group, a Tx power control command, activation indication information of Voice over IP (VoIP), and the like. A plurality of PDCCHs may be transmitted within a control region. A UE can monitor a plurality of PDCCHs. A PDCCH is transmitted as an aggregate of one or more contiguous Control Channel Elements (CCEs). The CCE is a logical allocation unit that is used to provide a coding rate based on a radio channel state to a PDCCH. The CCE may correspond to a plurality of Resource Element Groups (REGs). The format of PDCCH and the number of PDCCH bits may be determined according to the number of CCEs. A Base Station (BS) decides a PDCCH format according to DCI to be sent to the UE, and adds a Cyclic Redundancy Check (CRC) to control information. The CRC is masked with an identifier (e.g., Radio Network Temporary Identifier (RNTI)) according to a PDCCH owner or a purpose of the PDCCH. For example, provided that the PDCCH is provided for a specific UE, a CRC may be masked with an identifier of the corresponding UE (e.g., cell-RNTI (C-RNTI)). If PDCCH is provided for a paging message, a CRC may be masked with a paging identifier (e.g., Paging-RNTI (P-RNTI)). If a PDCCH is provided for system information (e.g., System Information Block (SIB)), a CRC may be masked with system Information RNTI (SI-RNTI). If PDCCH is provided for a random access response, a CRC may be masked with Random Access-RNTI (RA-RNTI). For example, CRC masking (or scrambling) may be performed using an exclusive OR (XOR) operation between CRC and RNTI at a bit level.

To initiate access to the network, a random access procedure is used. The random access procedure is also referred to as a Random Access Channel (RACH) procedure. Physical Random Access Channel (PRACH) transmission is under control of higher layer protocol which performs some important functions related to priority and load control. The PRACH is a common physical channel dedicated to the random access procedure. There are two kinds of RACH procedures: contention-based RACH procedure and non-contention-based RACH procedure. In the contention-based RACH procedure, many UEs can attempt to access the same base station simultaneously using same RACH preamble/resources, which may lead to network access congestions/collisions. Hereinafter, unless mentioned otherwise, a RACH (or RA) procedure means a contention-based RACH (or RA) procedure.

A RACH procedure can be used for several purposes. For example the RACH procedure can be used to access the network, to request resources, to carry control information, to adjust the time offset of the uplink in order to obtain uplink synchronization, to adjust the transmitted power, etc.

A RACH procedure can be initiated by the UE or the eNB. The RACH procedure may, for instance, be triggered by the following events:
  A UE switches from power-off to power-on and needs to be registered to the network.
  A UE is not time-synchronized with an eNB and starts transmitting data (for instance the user calls).
  An eNB starts transmitting data to the UE but they are not synchronized (for instance the user receives a call).
  An eNB measures a delay of the received signal from the UE (for instance the user is moving and has lost synchronization).

Figure 6:
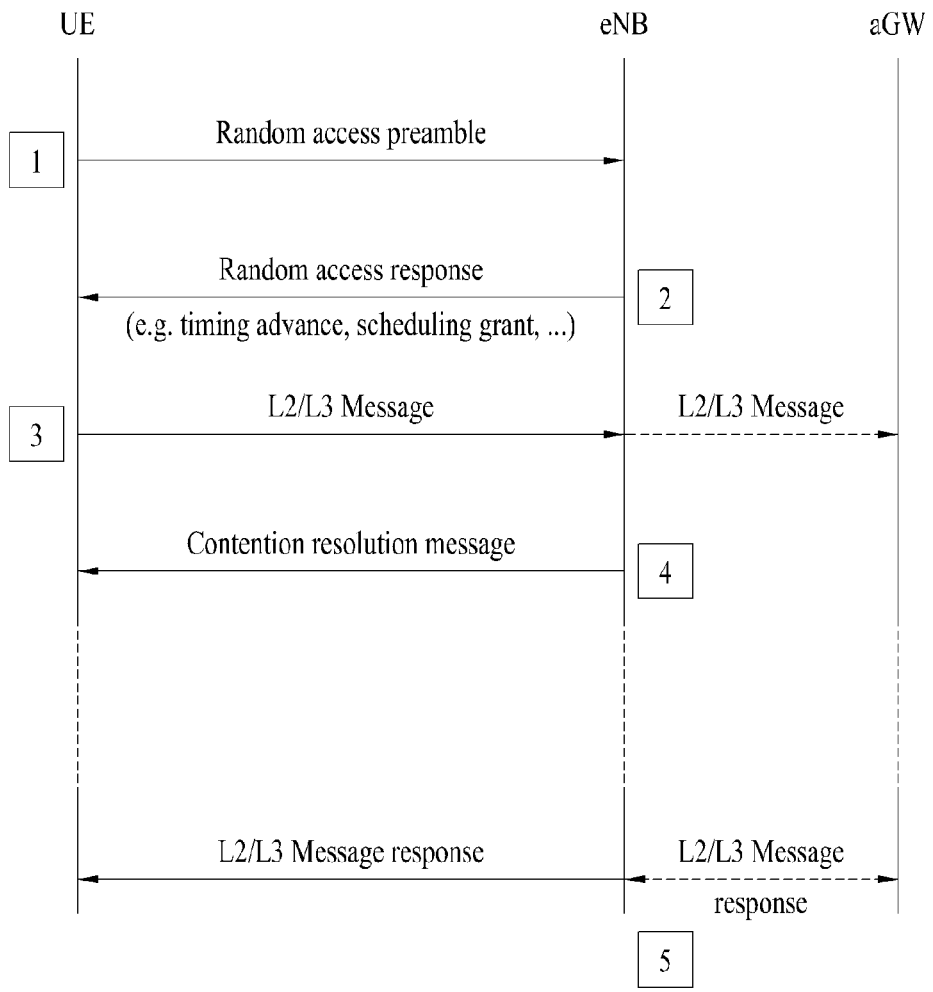
FIG. 6 shows a contention-based Random Access (RA) procedure.

FIG. 6 illustrates a contention-based random access procedure.

Referring to FIG. 6, firstly the UE retrieves information transmitted periodically from eNB on a downlink Broadcast Channel (BCH) and selects a preamble signature (e.g., Constant Amplitude Zero Auto-Correlation (CAZAC) sequence), a RACH time slot and a frequency band. The preamble signature is chosen by the UE from among a set of signatures known by the eNB. The UE generates a random access preamble (message 1, box 1) containing the chosen signature and transmits it to the eNB over the selected time slot at the selected frequency. The random access preamble is sent before a RACH connection request and indicates that the UE is about to transmit data. During the random access procedure, several UEs may share the same RACH channel (i.e., PRACH) and they are distinguished by preamble signatures. Congestions/collisions occur whenever several UEs choose the same signature and send it within the same time and frequency resources.

The eNB monitors the current RACH slot in an attempt to detect preambles transmitted from UEs in a corresponding cell. On reception of a signal, the eNB correlates the received signal in the RACH subframe with all possible signatures. Detection of the preamble can be either performed in the time domain or in the frequency domain. A detection variable is computed for each signature. If the detection variable exceeds a certain threshold, the preamble is considered detected.

The eNB sends a random access response (message 2, box 2) to acknowledge the successfully detected preambles. The random access response is sent via a downlink shared channel and includes the detected signature. The random access response also contains a timing advance command, a power-control command.

If the UE receives a random access response from the eNB, the UE decodes the random access response and adapts UL transmission timing, and UL transmission power if the random access response contains power control information. The UE then sends a resource request message (message 3, box 3) via an uplink shared channel. In the message 3, the UE requests bandwidth and time resources to transmit data and it also indicates a UE-specific identifier. When the UE requests resources, the UE uses a specific ID in the message 3 to resolve contentions. Then the UE monitors a specified downlink channel for response from the eNB. In the case of a positive resource grant, the subsequent transmissions are carried out as normal.

The eNB attempts to resolve any contentions. If the eNB receives a resource request with a UE-specific signature, the eNB checks how many UEs were detected with the same signature and resolves any possible contentions. If the preamble sent by a UE was in collision with a preamble from another UE, the eNB sends a contention resolution message (message 4, box 4) to command a corresponding UE to restart the RACH procedure. If the UE was not in collision, the eNB sends a resource assignment message (message 5, box 5). Subsequent transmissions are carried out as usual.

Figure 7A:
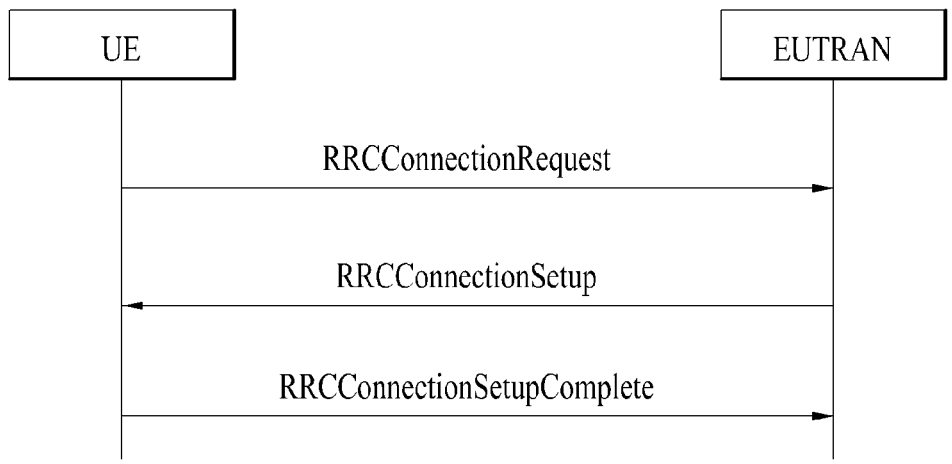
FIG. 7A~7B shows Radio Resource Control (RRC) connection request procedures.
Figure 7B:
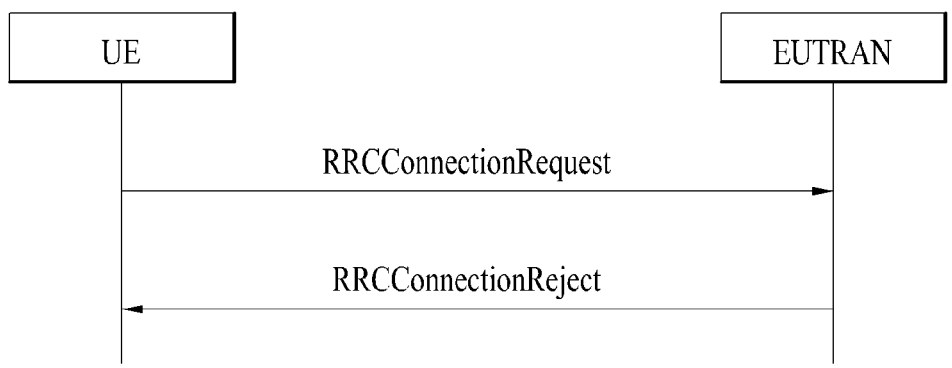

FIG. 7A~7B shows Radio Resource Control (RRC) connection request procedures. The purpose of this procedure is to establish an RRC connection. RRC connection establishment involves Signaling Radio Bearer1 (SRB1) establishment. The procedure is also used to transfer the initial NAS dedicated information/message from the UE to E-UTRAN. In particular, the UE initiates the procedure when upper layers request establishment of an RRC connection while the UE is in RRC_IDLE. Upon initiation of the procedure, the UE transmits a RRC connection request message to the E-UTRAN (e.g., eNB). In response to the RRC connection request message, the E-UTRAN (e.g., eNB) transmits a RRC connection setup message (FIG. 7A) or a RRC connection reject message (FIG. 7B). When the UE receives the RRC connection setup message, the UE enters RRC_CONNECTED, performs radio resource configurations including SRB addition, Data Radio Bearer (DRB) release/addition, MAC configuration, PHY configuration, and stops a cell reselection procedure.

Figure 8:
FIG. 8 shows a RRC connection release procedure.

FIG. 8 shows a RRC connection release procedure. The purpose of this procedure is to release the RRC connection, which includes the release of the established radio bearers as well as all radio resources. E-UTRAN (e.g., eNB) initiates the RRC connection release procedure to a UE in RRC_CONNECTED, and transmits a RRC connection release message to the UE in RRC_CONNECTED. Upon leaving RRC_CONNECTED, the UE enters RRC_IDLE, resets a MAC, releases all radio resources, including release of the RLC entity, the MAC configuration and the associated PDCP entity for all established RBs, and indicates the release of the RRC connection to upper layers. The UE in RRC_IDLE may perform a cell reselection procedure.

Proximity-Based Service (ProSe)

Recently, Proximity-based Service (ProSe) has been discussed in 3GPP. The ProSe enables different UEs to be connected (directly) each other (after appropriate procedure(s), such as a ProSe discovery, an authentication), through eNB only (but not further through Serving Gateway (S-GW, SGW)/Packet Data Network Gateway (PDN-GW, P-GW, PGW)), or through SGW/PGW (S/P-GW). The ProSe has various use cases and potential requirements for a network controlled discovery and communications between wireless devices that are in proximity, under continuous network control, and are under a 3GPP network coverage, for:

Commercial/social use

Network offloading

Public Safety

Integration of current infrastructure services, to assure the consistency of the user experience including reachability and mobility aspects Public Safety, in case of absence of EUTRAN coverage (subject to regional regulation and operator policy, and limited to specific public-safety designated frequency bands and terminals)

Figure 9:
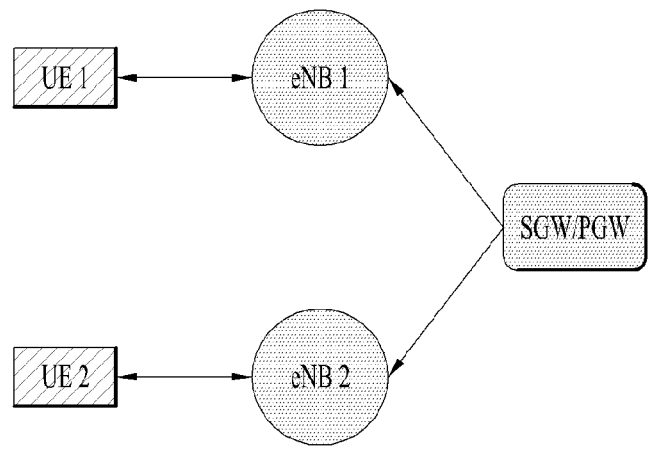
FIGS. 9, 10A and 10B show three types of data paths between two UEs when the data paths are established by ProSe Discovery.
Figure 10A:
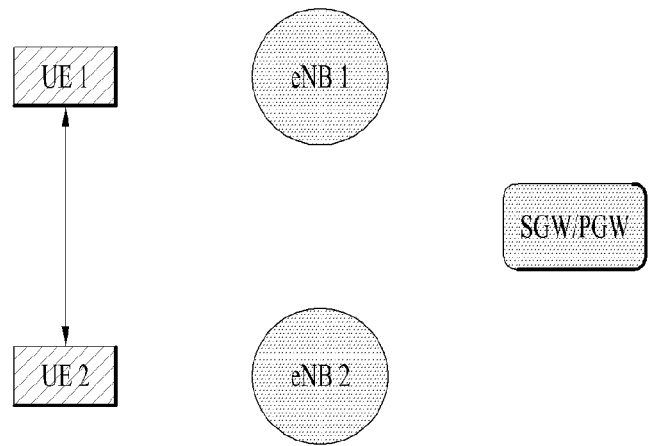
Figure 10B:
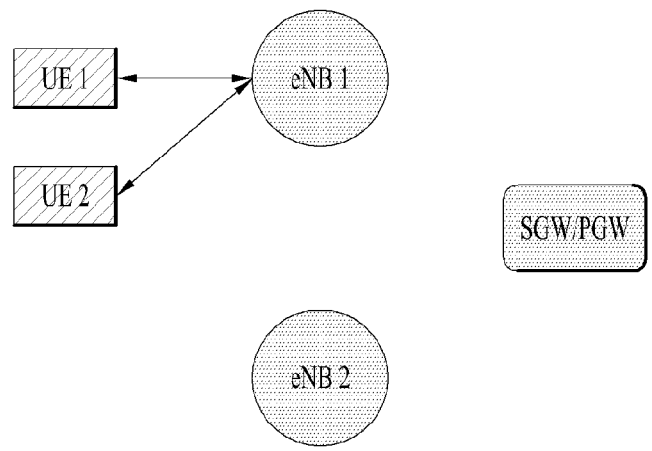

FIGS. 9, 10A and 10B show three types of data paths when the data paths are established by ProSe Discovery.

FIG. 9 shows an example of data path (or Evolved Packet Core Path (EPC Path)) in an Evolved Packet System (EPS) for communication between two UEs. Referring to FIG. 9, even when two UEs (e.g., UE1, UE2) in close proximity communicate with each other (after appropriate procedure(s), such as a ProSe discovery, an authentication), their data path (user plane) may go via the network (EPC Path). Thus the EPC Path for the communication involves eNB(s) and/or Gateway(s) (GW(s)) (e.g., SGW/PGW). The network may further include a network node related with the ProSe such as a ProSe server, a MME, and the like (hereinafter, ProSe-related node). The ProSe-related node may control a communication for proximity-based service. The ProSe-related node may be a part of the EPC Path or may be located out of the EPC Path.

FIGS. 10A~10B show two forms of data path scenarios for ProSe Communication between two UEs. FIG. 10A shows a direct mode data path in the EPS for communication between two UEs. FIG. 10B shows a locally-routed data path in the EPS for communication between two UEs when the UEs are served by the same eNB. In particular, if wireless devices (e.g., UE1, UE2) are in proximity of each other, they may be able to use a direct mode data path (FIG. 10A) or a locally routed data path (FIG. 10B). In the direct mode data path, wireless devices are connected directly each other (after appropriate procedure(s), such as a ProSe Discovery, an authentication), without eNB and SGW/PGW. In the locally routed data path, wireless devices under the coverage of the same eNB are connected to each other through the eNB (after appropriate procedure(s), such as a ProSe Discovery, an authentication).

For a communication for a proximity service (e.g., a communication triggered by a ProSe Discovery), the data path chosen, by the operator's policy and/or user consent, is happened to be E-UTRAN infrastructure path as shown in FIG. 9. In this case, the EPS may be required to be able to manage/control ProSe Discovery, communication for a proximity service, and/or ProSe-assisted WLAN direct communication by an application. For example, when a communication for a proximity service is necessary, EPS may be required to be able to manage/control the communication for the proximity service, including its:

Activation/deactivation;

Initiation/termination;

Duration and amount of data transferred;

QoS, if via E-UTRAN (e.g. levels of availability, allocated resource);

Inter-operator communication;

Inter-operator signaling.

Thus it is difficult to properly manage/control communications for proximity services, unless there is some mechanism to distinguish the communication for proximity service from an ordinary communication. For easy understanding of the present invention, a communication for proximity service (e.g., a communication triggered by a ProSe Discovery) may be referred to as a ProSe communication and the ordinary communication may be referred to as a Non-ProSe communication.

Figure 11A:
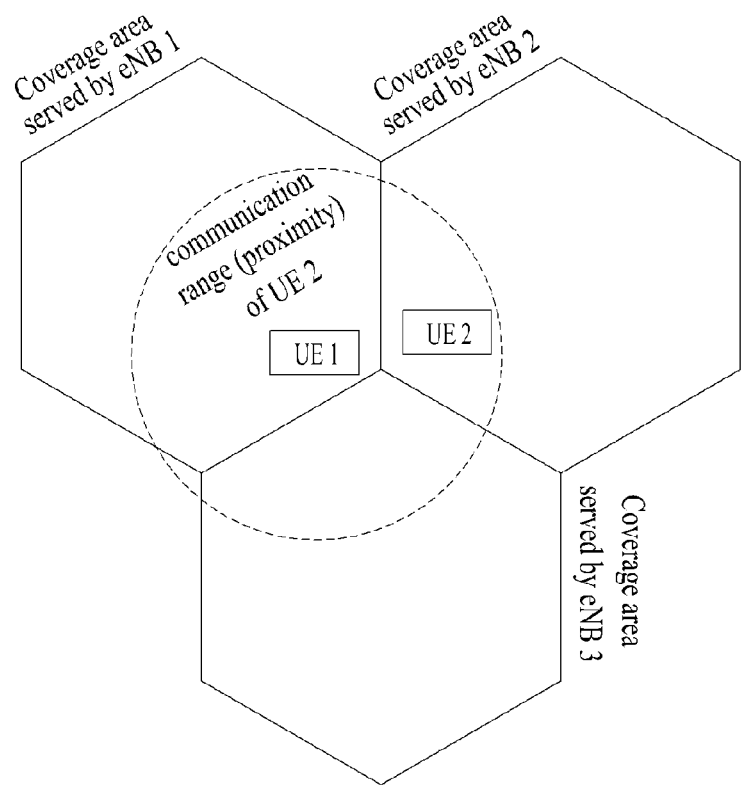
FIGS. 11A~11B shows an example of a ProSe communication.
Figure 11B:
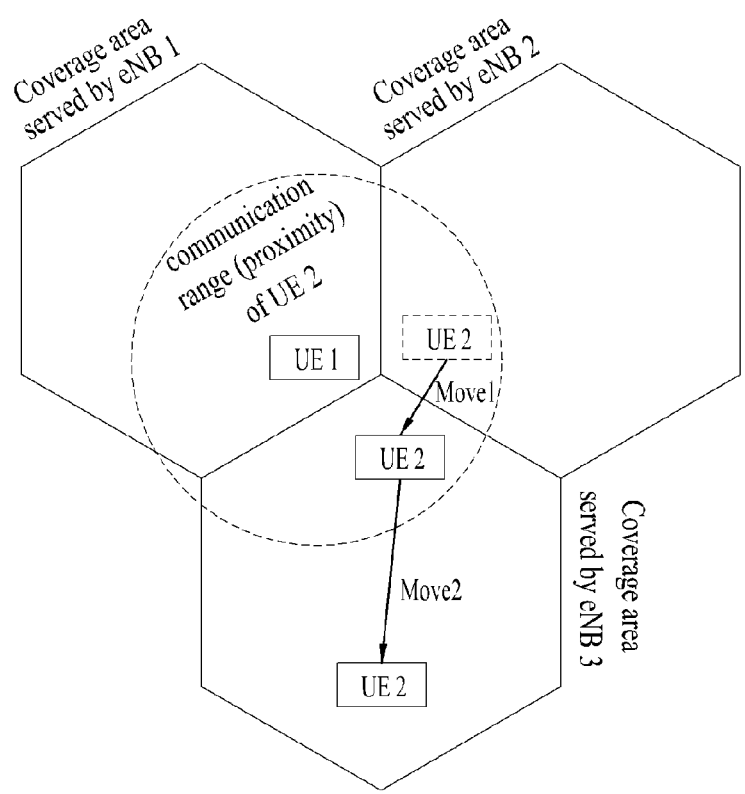

FIGS. 11A~11B show an example of a ProSe communication. Referring to FIG. 11A, UE 1 is located in a coverage area served by eNB 1 and UE 2 is located in a coverage area served by eNB 2. If UE 1 and UE 2 are in their proximity range (e.g., located in a Communication Range for a proximity-based service (for convenience, the Communication Range may be referred as a ProSe Communication Range)) and they need a ProSe communication, UE 1 and UE 2 may discover each other and establish a communication connection via a network path (e.g., EPC Path). Here, Communication Range for ProSe (or proximity-based service) may mean a communication range of a wireless 1-hop, unless mentioned otherwise. However, as shown in FIG. 11B, UE 2 may make moves to another locations. For example, UE 2 may make a move (Move 1) and another move (Move 2). When UE 2 makes Move 2, UE 2 is located out of the proximity range. Considering the connection was triggered to be made by ProSe Discovery for a particular service related to their proximity, if two UEs are getting out of the proximity range, it is preferable to release the ProSe connection. However, if an eNB or a core network does not know whether the communication is triggered by a ProSe Discovery or not, even if UE2 makes Move 2 getting out of the proximity range, UE 1 and UE 2 can stay connected via EPC Path. This will result in an anomaly of the service intended for their proximity at the particular time instant.

Figure 12:
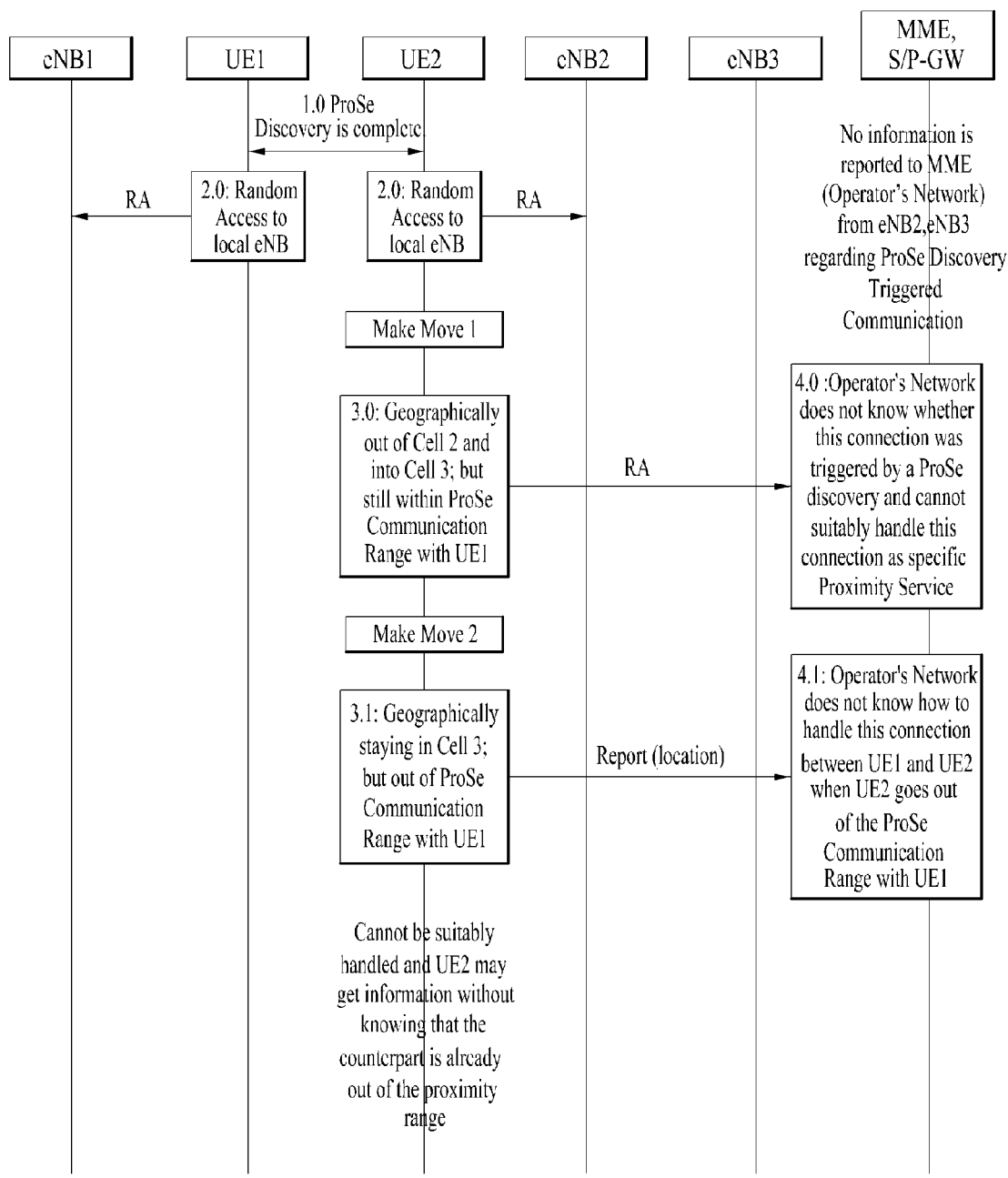
FIG. 12 shows an event flow of a ProSe communication.

FIG. 12 shows an event flow of FIG. 11B (i.e., a case when a communication path for a ProSe uses an EPC Path). Referring to FIG. 12, procedures may be performed as follows.

Step 1.0: ProSe discovery is completed between ProSe-enabled UEs (e.g., UE 1 and UE 2) in proximity. UE 1 and UE 2 may be located in a coverage area served by the same eNB, or located in different coverage areas served by different eNBs. Here, it is assumed that UE 1 is located in a coverage area served by eNB 1, and UE 2 is located in a coverage area served by eNB 2. A ProSe discovery procedure may include: transmission of a ProSe discovery request message and reception of a ProSe discovery response message. Using the ProSe discovery, UE 1 and UE 2 may share at least one of an Identifier (ID) of a counterpart UE, an ID related with ProSe (e.g., ProSe group ID, ProSe service ID).

Step 2.0: UE 1 may perform a random access (RA) procedure to access a network (or to request an establishment of a communication connection (e.g., RRC connection)). The random access procedure may be performed in accordance with FIG. 6. Since UE 1 is located in a coverage area served by eNB 1, UE 1 transmits a random access preamble to eNB 1 as a part of the random access procedure. Similarly, UE 2 may perform a random access (RA) procedure to access a network (or to request an establishment of a communication connection (e.g., RRC connection)). Since UE 2 is located in a coverage area served by eNB 2, UE 2 transmits a random access preamble to eNB 2 as a part of the random access procedure.

Step 3.0: UE 2 may make Move 1 (i.e., geographically out of a cell (here, Cell 2) served by eNB 2, and into a cell (here, Cell 3) served by eNB 3; but still within a proximity range with UE 1). With Move 1, UE 2 may perform a handover procedure to maintain a communication connection with UE 1. As a part of the handover procedure, UE 2 may transmit a RA preamble to eNB 3 and receive a RA response from eNB 3.

Step 3.1: In addition, UE 2 may make Move 2 (i.e., geographically staying in Cell 3; but out of the proximity range with UE 1). In the ProSe communication via an EPC Path, UE 2 may not know by itself whether it is staying within the proximity range with UE 1 or out, so UE 1 may have to rely on the network to recognize whether it is staying within the proximity range with UE 1 or out. To this end, it is assumed that a procedure of reporting location information of UE 2 to a ProSe-related node (e.g., ProSe server, MME, S/P-GW) is employed.

Steps 4.0~4.1: Since no information is reported to a network (e.g., MME) from eNB 1~3 regarding the ProSe discovery triggered communication, the network does not know whether the communication connection was triggered by the ProSe discovery and therefore the communication connection cannot be suitably handled as a proximity service. Accordingly, the network does not know how to handle the communication connection between UE 1 and UE 2 if UE 2 makes moves (e.g., goes out of the proximity range with UE 1).

As a result, the communication connection cannot be suitably handled for a proximity-based service, and UE 2 may keep getting information regarding the ProSe communication without knowing that the counterpart (i.e., UE 1) is already out of the proximity range. But, ProSe service generally requires that the communicating parties are within proximity. Thus, when the communicating parties are out of proximity, maintaining the communication connection may be useless and waste communication resources.

Thus, it is needed that the network is aware of the change in proximity and of the cause of a communication (e.g., the communication is triggered via ProSe Discovery); i.e., a mechanism to distinguish the ProSe communication (instance) from an ordinary (i.e., Non-ProSe) communication (instance). Hereinafter, the present invention proposes methods to distinguish the ProSe communication (instance) from the ordinary communication (instance), and methods to manage/control the ProSe communication accordingly. In the description, unless mentioned otherwise, a UE includes a ProSe-enabled UE.

Figure 13A:
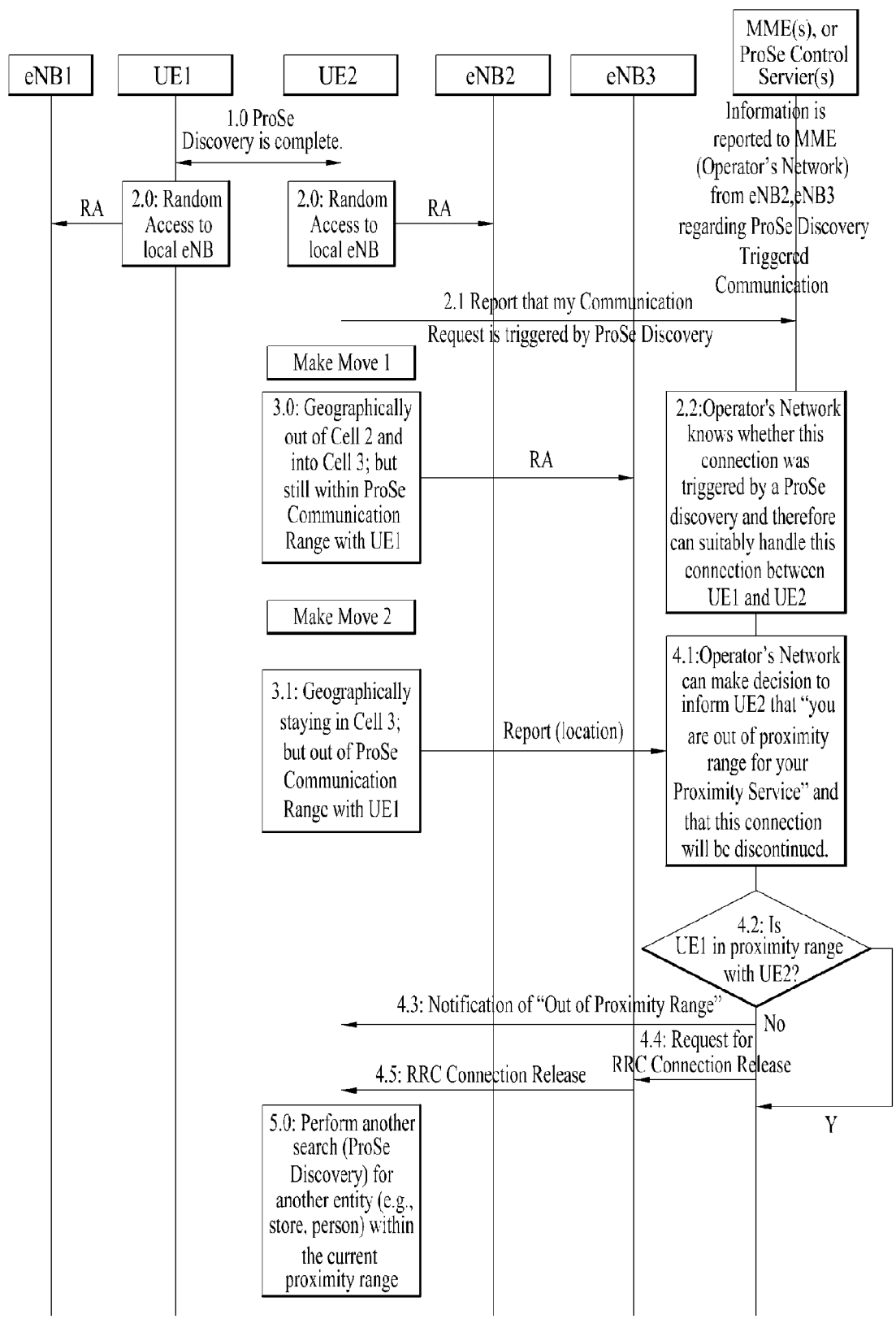
FIGS. 13A~13B show examples of ProSe communication procedure in accordance with the present invention.
Figure 13B:
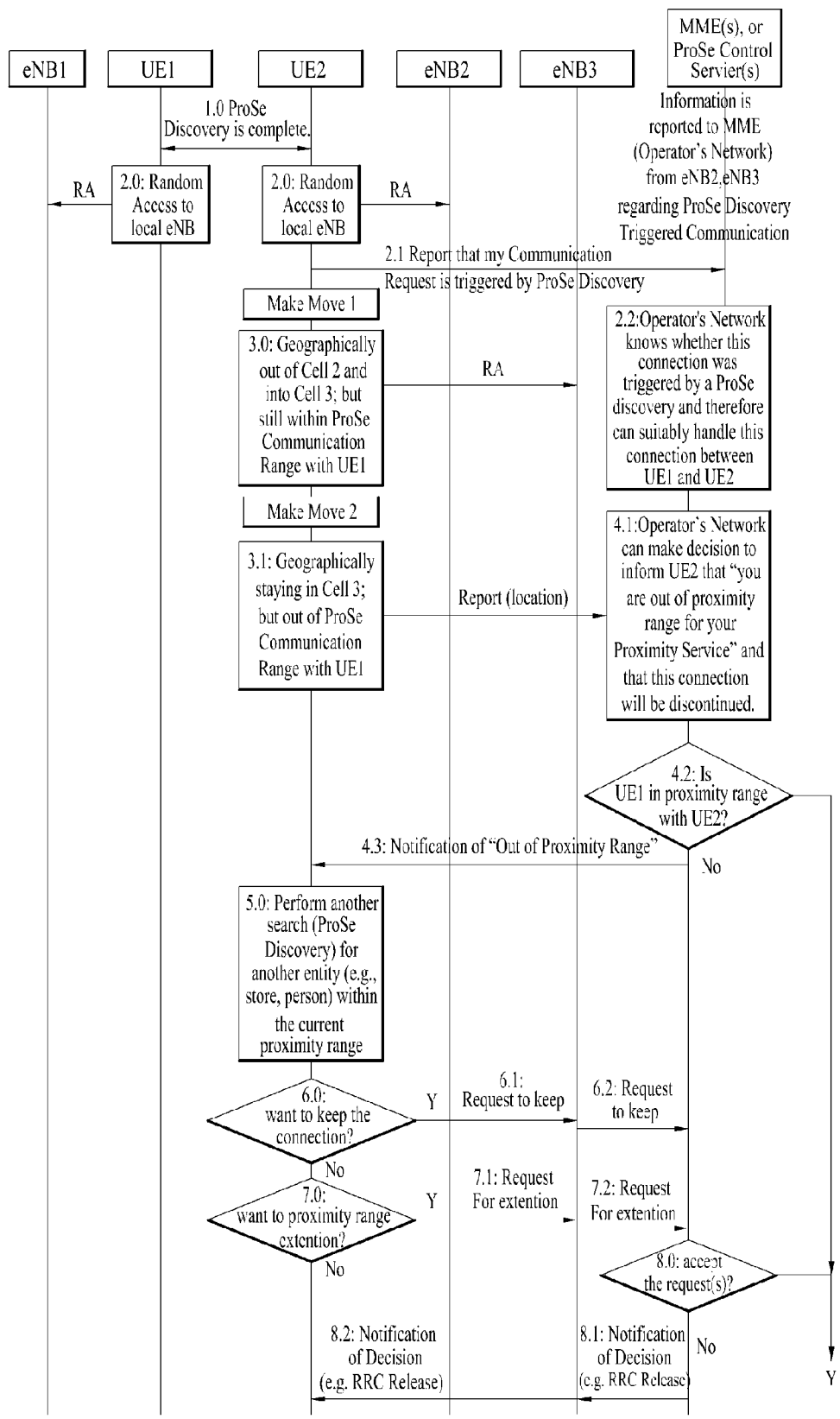

FIGS. 13A~13B show examples of ProSe communication procedure in accordance with the present invention. In FIGS. 13A~13B, a data path for the ProSe communications is established using a network infrastructure (e.g., E-UTRAN infrastructure) (i.e., ProSe communication via network path, EPC Path). The network infrastructure may include a ProSe-related node (e.g., a ProSe server, a MME, S/P-GW). For convenience, below example is described in view of one UE (e.g., UE 2) among two UEs (UE 1 and UE 2) participating a ProSe communication, but it is obvious that the same/similar operations are performed regarding the counterpart UE (e.g., UE 1). In the below steps, step 2.1 and related steps/operations (e.g., location report, notification of "Out of Proximity Range" and the like) are not performed in a normal (i.e., non-ProSe) communication connection.

Referring to FIGS. 13A~13B, procedures may be performed as follows.

Step 1.0: ProSe discovery is completed between ProSe-enabled UEs (e.g., UE 1 and UE 2) in proximity. UE 1 and UE 2 may be located in a coverage area served by the same eNB, or located in different coverage areas served by different eNBs. Here, it is assumed that UE 1 is located in a coverage area served by eNB 1, and UE 2 is located in a coverage area served by eNB 2. A ProSe discovery procedure may include: transmission of a ProSe discovery request message and reception of a ProSe discovery response message. Using the ProSe discovery, UE 1 and UE 2 may share at least one of an Identifier (ID) of a counterpart UE, an ID related with ProSe (e.g., ProSe group ID, ProSe service ID).

Steps 2.0: UE 1 may perform a procedure for requesting a communication connection (establishment) (e.g., RRC connection (establishment)), such as a random access (RA) procedure to access a network (or to request an establishment of a communication connection (e.g., RRC connection)). The random access procedure may be performed in accordance with FIG. 6. Since UE 1 is located in a coverage area served by eNB 1, UE 1 transmits a random access preamble to eNB 1 as a part of the random access procedure. Similarly, UE 2 may perform a random access (RA) procedure to access a network (or to request an establishment of a communication connection (e.g., RRC connection)). Since UE 2 is located in a coverage area served by eNB 2, UE 2 transmits a random access preamble to eNB 2 as a part of the random access procedure.

Step 2.1: In accordance with the present invention, UE 1 and/or UE 2 may transmission a message including information for reporting to the network (e.g., a ProSe-related node) that the communication connection request is triggered as a part of a ProSe procedure (e.g., a ProSe discovery). The message may be signaled using the random access procedure or a procedure different from the random access procedure. For example, following options are possible to inform the ProSe-related to that a cause of the connection request is for the ProSe.

Option A: Use of Establishment Cause

When a ProSe-enabled UE (e.g., UE 2) has discovered another ProSe-enabled UE of interest (e.g., UE 1), UE 2 may attempt to initiate/establish a (data) communication path with UE 1 under network's control. It is assumed that the network has options to choose based on the resource availability and QoS level to provide. If the network chooses to provide an E-UTRAN infrastructure path for a communication connection between UE 1 and UE 2, the network (e.g., eNB) may inform UE 2 to perform initial access;

UE 2 may insert a tag in the EstablishmentCause as "proSeInfra" (see, table 1); and (after successful Connection Establishment) the network can use the tag information to make a proper decision for managing the established communication connection.

TABLE 1

RRC connection request message

| | |
|---|---|
| EstablishmentCause ::= | ENUMERATED { emergency, highPriorityAccess, mt-Access, mo-Signalling, mo-Data, delayTolerantAccess-v1020, proSeInfra, spare1} |
| Possible extension (optional): | |
| ReestablishmentCause ::= | ENUMERATED { reconfigurationFailure, handoverFailure, otherFailure, proSeInfra,spare1} |

The RRC connection request message may be embedded in the message 3 of a random access procedure or may be transmitted using a different procedure.

Option B: Use of Instance ID

When a ProSe-enabled UE (e.g., UE 2) has discovered another ProSe-enabled. UE of interest (e.g., UE 1), UE 2 may make a randomly (i.e., not controlled by the network) generated instance ID and share the instance ID with the network (e.g., eNB) for the future correspondence with the instance. Here, an instance may mean a communication connection. The sharing of the instance ID can be online or offline, depending on the situation. For example, UE 2 may report information about the instance ID to the network (e.g., a ProSe-related node), and the network may make a (coordinated) instance ID for the future correspondence with the instance ID. The instance ID may be transmitted via the RRC connection request message. In this case, presence of the instance ID may be interpreted as tag information indicating that the EstablishmentCause is "proSeInfra". The instance ID may be embedded in the message 3 of a random access procedure or may be transmitted using a different procedure. Then, under network's control, UE 2 may attempt to initiate/establish a (data) communication path with UE 1. In this case, UE 2 and the network may use the information (i.e., Instance ID), for the network to make a proper decision for managing/controlling the established communication connection.

The instance ID may be generated, e.g., per a communication connection for proximity-based service by using at least one of a (ProSe) group ID, a (ProSe) service ID, identification information of discovering UE (e.g., a discovering UE ID), identification information of discovered UE (e.g., a discovered UE ID). For example, a set of sequentially concatenated UE IDs (e.g., discovering UE ID+discovered UE ID) may be used as a parameter to generate the instance ID. In this case, the (ProSe) group ID and the (ProSe) service ID may be used as additional parameter(s) to generate the instance ID. One or more timers can be used for instance ID. For example, two timers may be configured for an instance ID, in which the first timer may be used for periodically reporting location information (see, step 3.1), and the second timer may be used for assuming an effective time length of the established communication connection. The second timer may run at the time when a communication connection for proximity-based service is initiated. And, if the second timer expires before UE 2 receives a message indicating that UE 1 (UE 2) is within proximity range with UE 2 (or UE 1), UE 2 may transmit a RRC connection release message to the network (e.g., eNB). In this case, the network may accept or reject the RRC connection release request in consideration of at least one of the location of UE 2, resource availability, QoS, etc.

The instance ID may be used to scramble a physical shared channel (e.g., PDSCH, PUSCH) if the physical shared channel carries data for a ProSe communication. For example, the instance ID may be used to determine an initialization value for a scrambling sequence. For example, the physical shared channel is scrambled using a scrambling sequence having an initialization value of the following equation (binary format):

$$c_{init} = ID \cdot 2^{13} + \lfloor n_s/2 \rfloor \cdot 2^9 + N_{ID}^{cell}$$

where $n_s$ is a slot number in a radio frame, ID is the instance ID, $N_{ID}^{cell}$ is a physical cell ID, and $\lfloor \ \rfloor$ is a flooring function. If the physical shared channel carries data for a ProSe communication, ID has non-zero value (e.g., positive integer). But, if the physical shared channel carries data for a normal (i.e., non-ProSe) communication, ID has 0.

The scrambling sequence c(n) may be generated by using following equation:

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$

where n=0, 1, . . . , $M_{PN}-1$, $M_{PN}$ is a sequence length, $N_C=1600$, $x_1(0)=1, x_1(n)=0, n=1, 2, \ldots, 30$, and $\Sigma_{i=0}^{30} x_2(i) \cdot 2^i = c_{init} = h \cdot 2^{13} + \lfloor n_s/2 \rfloor \cdot 2^9 + ID$.

Option C: Use of RA Preamble

Some of random access preambles may be reserved for reporting to the network (e.g., ProSe-related node) that the communication connection request is triggered as a part of a ProSe procedure (e.g., a ProSe discovery). To this end, the network broadcasts system information indicating a number N of total available random access preambles in a cell and a number M of random access preambles reserved for ProSe. In this case, random access preamble sequences #0 to #N−1 are used for a normal (i.e., Non-ProSe) random access procedure, and random access preamble sequences #N to #M−1 are used for reporting to the network that the communication connection request in the message 3 is triggered as a part of a ProSe procedure.

Step 3.0: UE 2 may make Move 1 (i.e., geographically out of a cell (here, Cell 2) served by eNB 2, and into a cell (here, Cell 3) served by eNB 3; but still within a proximity range with UE 1). With Move 1, UE 2 may perform a handover procedure to maintain a communication connection with UE 1. As a part of the handover procedure, UE 2 may transmit a RA preamble to eNB 3 and receive a RA response from eNB 3.

Step 3.1: In addition, UE 2 may make Move 2 (i.e., geographically staying in Cell 3; but out of the proximity range with UE 1). In the ProSe communication via an EPC Path, UE 2 may not know by itself whether it is staying within the proximity range with UE 1 or out, so UE 1 may have to rely on the network to recognize whether it is staying within the proximity range with UE 1 or out. In this case, UE 2 may perform a procedure of reporting location information of UE 2 to a ProSe-related node (periodically or based on an event). The location information may include information directly indicating the location of UE 2 or information used to calculate the location of UE 2. For example, the location information may be generated based on, for example, Global Positioning System (GPS) or Positioning Reference Signal. For example, UE 2 may report location information based on the GPS to the ProSe-related node. UE 2 may measure PRSs received from neighboring transmission points (e.g., eNBs) and report PRS measurement result to the ProSe-related node. In this case, the ProSe-related node may obtain location information of UE 2 from a positioning server by using the PRS measurement result. Alternatively, UE 2 may obtain its location information from the positioning server by transmitting the PRS measurement to the positioning server, and then report its location to the ProSe-related node. The positioning server may be a part of the ProSe-related node or may be a different network node from the ProSe-related node.

Steps 4.0~4.1: Since information is reported to the ProSe-related node (e.g., MME) from eNB 1~3 regarding the ProSe discovery triggered communication, the network knows whether the communication connection was triggered by the ProSe discovery and therefore can suitably handle the communication connection between UE 1 and UE 2 as a proximity service. As a result, if UE 2 makes moves (e.g., goes out of the proximity range with UE 1), UE 2 may keep getting information regarding the ProSe communication without knowing that the counterpart UE (i.e., UE 1) is already out of proximity range but the communication connection for proximity-based service can be suitably handled as exemplified in following steps. For example, the network may make a decision to inform UE 2 that "you are out of a proximity range (e.g., a Communication Range for your proximity service)" and that the communication connection will be discontinued. Particular steps will be performed as follows.

Steps 4.2~4.3: Upon receipt of the report regarding the location of UE (e.g., UE 2), the ProSe-related node may check whether UE 1 is in a proximity range with UE 2. If UE 1 (or UE 2) is in a proximity range with UE 2 (or UE 1), the ProSe-related node may transmit no notification to UE 2 or a notification of "Within Proximity Range" to UE 2. But, if UE 1 (or UE 2) is in the proximity range with UE 2 (or UE 1), the network node related the ProSe may transmit a notification of "Out of Proximity Range" to UE 2. Following the notification of "Out of Proximity Range", two procedures are possible as shown in FIGS. 13A~13B.

Procedure A (FIG. 13A)

Steps 4.4~4.5: After transmitting the notification of "Out of Proximity Range", the ProSe-related node may transmit a request for RRC connection release to eNB 3, and then eNB 3 may transmit a RRC connection release message to UE 2. The RRC connection release procedure may be performed as shown in FIG. 8.

Step 5.0: Upon receipt of the RRC connection release message, UE 2 may leave RRC_CONNECTED, enter RRC_IDLE, reset a MAC, release all radio resources, including release of the RLC entity, the MAC configuration and the associated PDCP entity for all established RBs, and indicate the release of the RRC connection to upper layers. Then, if necessary, UE 2 may perform a search (e.g., ProSe discovery procedure) for another ProSe-enabled entity (e.g., store, person) within the current proximity range.

Procedure B (FIG. 13B)

Step 5.0: Upon receipt of the notification of "Out of Proximity Range (e.g., Communication Range for a proximity service", UE 2 may perform a search (e.g., ProSe discovery procedure) for another ProSe-enabled entity (e.g., store, person) within the current proximity range while maintaining the state of RRC_CONNECTED. The search may be performed optionally.

Steps 6.0~6.2: For any reason (e.g., a result of the search), if UE 2 wants to keep the current communication connection with UE 1, UE 2 may transmit a request to keep the communication connection to the ProSe-related node via eNB 3.

Steps 7.0~7.2: These steps may be alternatives of steps 6.0~6.2. In particular, for any reason (e.g., a result of the search), if UE 2 wants to extend the current proximity range for the communication connection with UE 1, UE 2 may transmit a request for proximity range extension to the ProSe-related node via eNB 3.

Steps 8.0~8.2: Upon receipt of the request(s) of steps 6.0 and/or 7.0, the ProSe-related node may determine whether to accept the request or not. If the ProSe-related node determines to accept the request(s) of steps 6.0 and/or 7.0, for example steps 3.0 to 8.0 may be performed in accordance with situations (e.g., moves of UE 2), and no notification may be transmitted related with the determination of step 8.0. If the ProSe-related node determines not to accept the request(s) of steps 6.0 and/or 7.0, the network node related with the ProSe may transmit a request for RRC connection release to eNB 3, and then eNB 3 may transmit a RRC connection release message to UE 2. The RRC connection release procedure may be performed as shown in FIG. 8. Upon receipt of the RRC connection release message, UE 2 may leave RRC_CONNECTED, enter RRC_IDLE, reset a MAC, release all radio resources, including release of the RLC entity, the MAC configuration and the associated PDCP entity for all established RBs, and indicate the release of the RRC connection to upper layers. Then, if necessary, UE 2 may perform a search (e.g., ProSe discovery procedure) for another ProSe-enabled entity (e.g., store, person) within the current proximity range.

Figure 14:
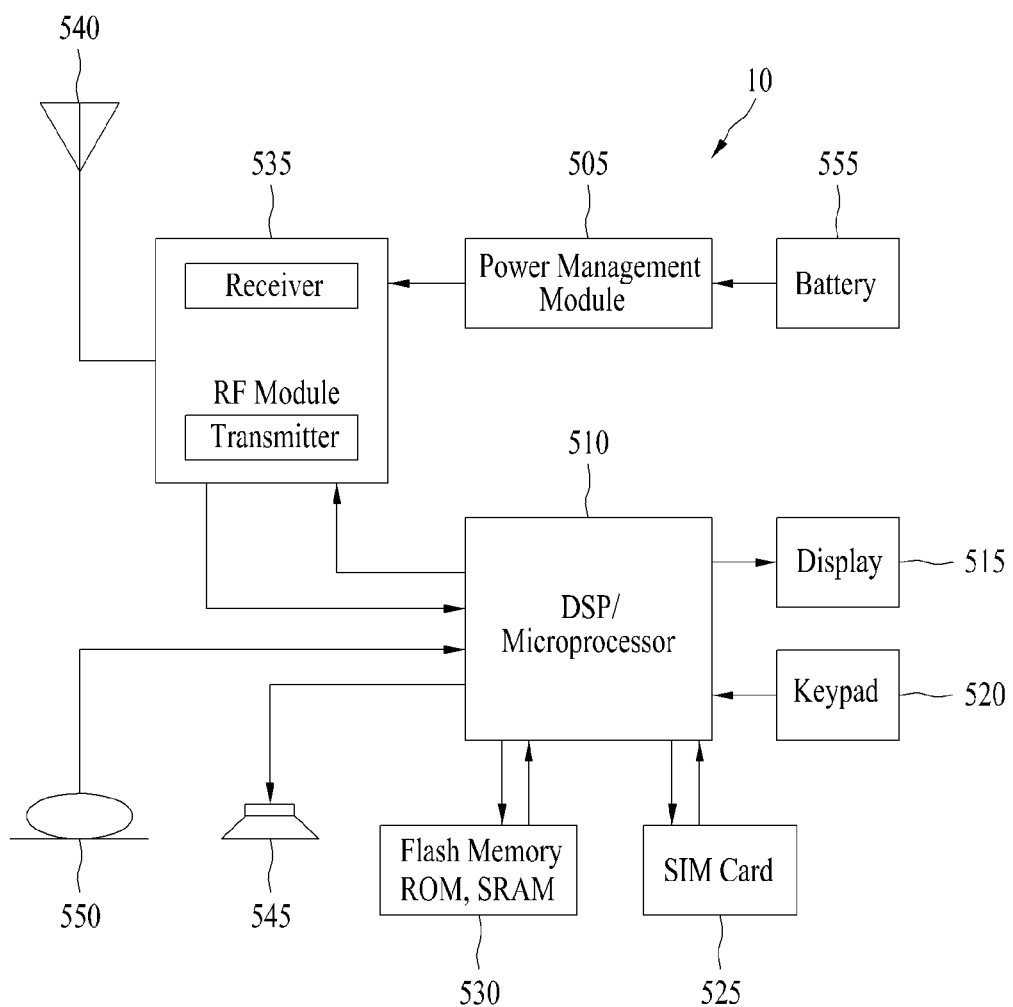
FIG. 14 shows a block diagram of a UE or Mobile Station (MS).

FIG. 14 illustrates a block diagram of a UE or Mobile Station (MS) 10. The UE 10 includes a MTC device or a delay-tolerant device. The UE 10 includes a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF module 535, to initiate communication, for example, transmits radio signals comprising voice communication data. The RF module 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example. The processor 510 also includes the protocols and functions necessary to perform the various processes described herein.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS (or eNB) and a UE. A specific operation which has been described as being performed by the eNB (or BS) may be performed by an upper node of the BS (or eNB) as the case may be. In other words, it will be apparent that various operations performed for communication with the UE in the network which includes a plurality of network nodes along with the BS (or eNB) can be performed by the BS or network nodes other than the BS (or eNB). The BS may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a method and an apparatuses for a proximity-based service, specifically, for cooperative discovery (i.e., node cooperation) for the proximity-based service.

The invention claimed is:

1. A method of managing a communication connection by a User Equipment (UE) in a wireless communication system, the method comprising:
   transmitting a first message for requesting a Radio Resource Control (RRC) connection,
   wherein the first message includes a cause of the request and an identifier, the cause of the request being related with a Proximity-based Service (ProSe), and the identifier being randomly generated for the communication connection by the UE and set to be effective for a predetermined time;
   establishing the communication connection via a network path; and
   receiving a second message from a ProSe server,
   wherein the second message indicates whether the communication connection is out of proximity range or not, and
   wherein, when the second message indicates that the communication connection is out of the proximity range, a third message for requesting one of a proximity range extension and a communication connection release is transmitted to the ProSe server.

2. The method of claim 1, wherein when the second message indicates that the communication connection is within the proximity range, no message is transmitted to the ProSe server in response to the second message.

3. The method of claim 1, wherein a fourth message for updating a location of the UE is periodically transmitted to the ProSe server before receiving the second message.

4. The method of claim 1, wherein when the predetermined time has passed before the UE receives the second message indicating that the communication connection is within the proximity range, a fourth message for requesting the communication connection release is transmitted to the ProSe server.

5. The method of claim 1, wherein type of the network path includes an Evolved Packet Core (EPC) Path.

6. A user equipment (UE) configured to manage a communication connection in a wireless communication system, the UE comprising:
 a radio frequency (RF) unit; and
 a processor, wherein the processor is configured to:
  transmit a first message for requesting a Radio Resource Control (RRC) connection,
  wherein the first message includes a cause of the request and an identifier, the cause of the request being related with a Proximity-based Service (ProSe), and the identifier being randomly generated for the communication connection by the UE and set to be effective for a predetermined time,
  establish the communication connection via a network path, and
  receive a second message from a ProSe server,
  wherein the second message indicates whether the communication connection is out of proximity range or not, and
  wherein, when the second message indicates that the communication connection is out of the proximity range, a third message for requesting one of a proximity range extension and a communication connection release is transmitted to the ProSe server.

7. The UE of claim 6, wherein when the second message indicates that the communication connection is within the proximity range, no message is transmitted to the ProSe server in response to the second message.

8. The UE of claim 6, wherein a fourth message for updating a location of the UE is periodically transmitted to the ProSe server before receiving the second message.

9. The UE of claim 6, wherein when the predetermined time has passed before the UE receives the second message indicating that the communication connection is within the proximity range, a fourth message for requesting the communication connection release is transmitted to the ProSe server.

10. The UE of claim 6, wherein type of the network path includes an Evolved Packet Core (EPC) Path.

* * * * *